US008264340B2

(12) United States Patent
Mazzolini et al.

(10) Patent No.: US 8,264,340 B2
(45) Date of Patent: Sep. 11, 2012

(54) ELECTRONIC DEVICE FASTENER

(76) Inventors: James Mazzolini, Hawthorne, CA (US); Vladimir Buzga, Torrance, CA (US)

( * ) Notice: Subject to any disclaimer, the term of this patent is extended or adjusted under 35 U.S.C. 154(b) by 555 days.

(21) Appl. No.: 12/515,364

(22) PCT Filed: Nov. 19, 2007

(86) PCT No.: PCT/US2007/024223

§ 371 (c)(1), (2), (4) Date: May 18, 2009

(87) PCT Pub. No.: WO2008/060636

PCT Pub. Date: May 22, 2008

(65) Prior Publication Data

US 2010/0045455 A1 Feb. 25, 2010

Related U.S. Application Data

(60) Provisional application No. 60/859,603, filed on Nov. 18, 2006.

(51) Int. Cl.

| | |
|---|---|
| ***G08B 19/00*** | (2006.01) |
| ***G08B 1/08*** | (2006.01) |
| ***G08B 13/14*** | (2006.01) |
| ***H04M 1/00*** | (2006.01) |

(52) U.S. Cl. .............. 340/521; 340/539.11; 340/539.32; 340/568.1; 340/568.7; 340/665; 340/686.4; 455/410; 455/424; 455/575.1; 455/575.6

(58) Field of Classification Search .................. 340/521, 340/539.32

See application file for complete search history.

(56) References Cited

U.S. PATENT DOCUMENTS

| | | | | |
|---|---|---|---|---|
| 4,871,997 | A | 10/1989 | Adriaenssens et al. | |
| 6,570,726 | B2 * | 5/2003 | Mutoh | 360/60 |
| 6,674,358 | B1 * | 1/2004 | Tinsley | 340/7.63 |
| 7,019,622 | B2 * | 3/2006 | Orr et al. | 340/407.1 |
| 2004/0070499 | A1 * | 4/2004 | Sawinski | 340/568.1 |

OTHER PUBLICATIONS

International Search Report for PCT/US2007/24223.

* cited by examiner

*Primary Examiner* — Donnie Crosland

(74) *Attorney, Agent, or Firm* — Brooks Kushman P.C.

(57) ABSTRACT

An electronic device fastener (EDF) to protect a portable device that is placed in a holder which may be a case, belt clip, holster, cradle, or the like worn or carried by the user that uses a release sensor, proximity sensor, shock sensor, and clip sensor to protect a portable device such as a cell phone, portable media player, personal digital assistant (PDA), two-way radio, GPS device, headset, or earpiece from loss and misplacement. The system can provide up to five modes of protection against loss and misplacement of a portable device.

12 Claims, 14 Drawing Sheets

CIRCUIT BLOCK DIAGRAM

CIRCUIT BLOCK DIAGRAM

EDF BUILT INTO BELT CLIP

EDF BUILT INTO CASE

EDF BUILT INTO HOLSTER

EDF BUILT INTO PORTABLE DEVICE

SCHEMATIC ELECTRONIC CIRCUIT
Electronic Device Fastener (EDF)

CROSS SECTIONAL VIEW BELT CLIP

LEFT PERSPECTIVE VIEW BELT CLIP

RIGHT PERSPECTIVE VIEW BELT CLIP

BOTTOM PERSPECTIVE VIEW BELT CLIP

CASE SIDE ELEVATION VIEW

CASE TOP ELEVATION VIEW

EDF BUILT INTO PORTABLE DEVICE

OPERATION FLOW CHART

ELECTRONIC DEVICE FASTENER

REFERENCED TO RELATED APPLICATION

This application is a 371 national phase application of PCT/US2007/024223 filed Nov. 19, 2007 which claims the benefit of U.S. provisional application Ser. No. 60/859,603 filed Nov. 18, 2006.

BACKGROUND OF THE INVENTION

1. Field of the Invention

System to protect a portable device that is placed in a holder which may be a case, belt clip, holster, cradle, or the like worn or carried by the user. It has been found that small portable devices that the user carries are subject to loss and misplacement by their respective owners due to the fact that they are small and may get dislodged from their case accidentally or are easy to misplace or forget. Portable devices such as cell phones, portable media players, and PDA's are usually placed in a holder that is carried or attached to a person using a case, holster, or belt clip. More and more people are purchasing cell phones with personal digital assistant features and the loss of these devices containing personal information is becoming more and more of a problem. Cell phones, private address books, and data files along with portable media players loaded with music files can be expensive, and loss such a cell phone with this private information can be severe. Thus, a need exists in the art for a system to be designed into a holder to prevent such loss as well as misplacement.

2. General Background and State of the Art

A search of the prior art did not disclose any patents that read directly on the claims of the instant invention. The prior art devices related to the use of alarms for portable devices neither anticipate nor disclose any embodiment that would preclude the novelty and the utilitarian functionality of the features of the present invention. It is clear that there exists a need in the art for a system and corresponding method for preventing loss and misplacement of portable devices, that is less burdensome, less expensive and more efficient than prior art systems for preventing loss of portable devices. It is the purpose of this invention to fulfill the above-described needs in the art, as well as other needs which will become apparent to the skilled artisan from the following detailed description of this invention.

SUMMARY OF THE INVENTION

System for preventing loss and misplacement of a portable device that the user carries such as a cell phone, portable media player, personal digital assistant (PDA), two-way radio, GPS device, headset, or earpiece.

This invention fulfills the above-described needs in the art by providing a system for reducing the risk of loss and misplacement of a portable device, the system comprising of an electronic device fastener (EDF) built into the periphery of a portable device or a holder. The portable device may be a cell phone, portable media player, personal digital assistants (PDA), two-way radio, GPS device, headset, earpiece, and other devices that the user could carry. The holder is a receptacle for a portable device designed to be worn or carried by the user and may be a belt clip, case, holster, or the like worn or carried by the user.

The electronic device fastener (EDF) uses a release sensor, proximity sensor, shock sensor, and clip sensor allowing the system to provide up to five modes of protection against loss and misplacement of a portable device. In the first mode, the EDF uses the proximity sensor to time how long the portable device has been removed from the EDF. After a predetermined period of time (example 5 minutes), a warning signal will be provided to the user that the portable device is missing from the holder. The warning signal is provided for a predetermined period of time (example 60 seconds) and if it is not cancelled then a missing alarm will occur. The user can cancel the missing warning or alarm by placing the portable device back into the holder or reset the timer by pressing the release sensor on the EDF. In the second mode, the EDF monitors the proximity sensor and provides an alarm if the portable device is dislodged from the holder without the release sensor being pressed. The user can cancel the dislodged alarm by placing the portable device back into the holder or by pressing the release sensor on the EDF. In the third mode, the EDF monitors the clip sensor and provides a warning if the clip sensor becomes detached from an article of clothing. The warning signal is provided for a predetermined period of time (example 15 seconds) and if it is not cancelled then a detachment alarm will occur. The user can cancel the detachment alarm by placing the portable device back onto the article of clothing which activates the clip sensor or by pressing the release sensor on the EDF. In the forth mode, the EDF monitors a shock sensor and provides an alarm if the holder falls from the article of clothing and hits a surface such as a floor. The user can cancel the dropped alarm by placing the portable device back onto the article of clothing which activates the clip sensor or by pressing the release sensor on the EDF. In the fifth mode, the EDF uses the release sensor, and/or proximity sensor to notify the user by sound, light, or vibration that the portable device is properly removed from the holder or secured into the holder and that the EDF is protecting the device.

In accordance with preferred embodiments of the present invention, the electronic device fastener (EDF) may be build in the built into the periphery of a portable device, or the holder, or a portion of the electronic device fastener (EDF) build into the portable device and the remaining portion built into the holder.

In a preferred embodiment, the system provides a portable device missing from holder alarm comprising of the following elements: (a) release sensor, and (b) proximity sensor, and (c) timing mechanism to determine how long the portable device has been removed from the holder, and (d) a means to provide a portable device missing from holder warning signal using the alert generator and signaling device and timing mechanism measuring a predetermined period of time as defined by operation flow, and (e) a means to deactivate the portable device missing from holder warning signal by placing the portable device back into the holder which activates the proximity sensor or by pressing the release sensor, and (f) a means to provide a portable device missing from holder alarm signal using the alert generator and signaling device indicating the portable device is missing, and (g) a means to deactivate the portable device missing from holder alarm signal by placing the portable device back into the holder which activates the proximity sensor or by pressing the release sensor, and (h) a means to provide a battery power to the EDF circuitry.

In a further embodiment, the system provides a portable device dislodged from holder alarm comprising of the following elements: (i) a means to monitor the proximity sensor by operation flow and provide an alarm signal using the alert generator and signaling device if the portable device is dislodged from the holder without the release sensor being pressed, and (j) a means to deactivate the portable device dislodged from holder alarm signal by placing the portable device back into the holder which activates the proximity sensor or by pressing the release sensor.

In a further embodiment, the system provides a holder detached from user alarm comprising of the following elements: (k) clip sensor, and (l) a means to monitoring the clip sensor by operation flow to determine if the holder spring loaded clip becomes detached from the belt, pant, shirt, jacket, article of clothing, or another object, and (m) an optional means to provide a holder detached from user warning signal using the alert generator and signaling device and timing mechanism measuring a predetermined period of time as defined by operation flow, and (n) an optional means to deactivate the holder 6 detached from user warning signal by placing the portable device back onto the article of clothing which activates the clip sensor or by pressing the release sensor, and (o) a means to provide a holder detached from user alarm signal using the alert generator and signaling device indicating the clip is dislodged, and (p) a means to deactivate the holder detached from user alarm signal by placing the portable device back onto the article of clothing which activates the clip sensor or by pressing the release sensor.

In a further embodiment, the system provides a EDF dropped alarm comprising of the following elements: (q) shock sensor, and (r) a means to monitoring the shock sensor by operation flow to determine if the EDF falls from the article of clothing and hits a surface such as a floor, and (s) a means to provide a EDF dropped alarm signal using the alert generator and signaling device indicating the EDF has been dropped, and (t) a means to deactivate the EDF dropped alarm signal by placing the portable device back onto the article of clothing which activates the clip sensor or by pressing the release sensor.

In a further embodiment, the system provides a notification of portable device removed or secured comprising of the following elements: (u) a means to monitor the release sensor and proximity sensor for activation, and (v) a means to provide a notification signal by operation flow using the alert generator and signaling device that the portable device is properly secured into the holder and that the EDF is protecting the device, and (w) a means to provide a notification signal by operation flow using the alert generator and signaling device that the portable device is properly removed from the holder and that the EDF is protecting the device.

This invention will now be described with respect to certain embodiments thereof, accompanied by certain illustrations, wherein:

The features and advantages of the present invention will become apparent in the following detailed description of preferred embodiments of the invention, with reference to the attached drawings, wherein:

DESCRIPTION OF THE PREFERRED EMBODIMENTS

Figure 1:
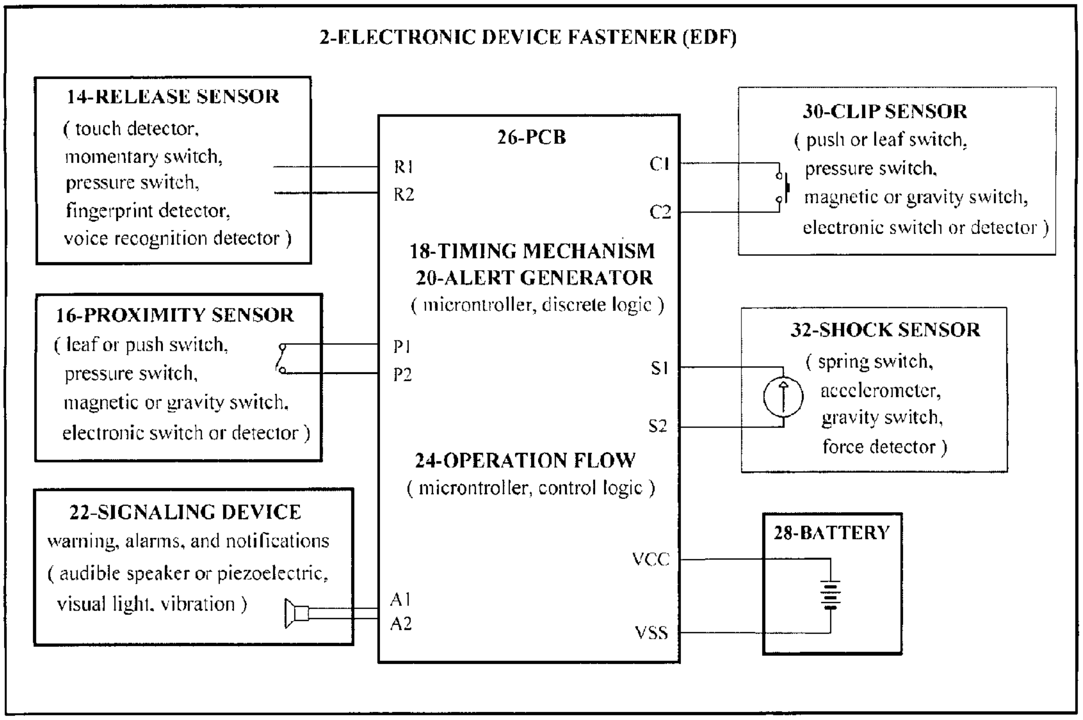
FIG. 1 is a circuit block diagram of a electronic device fastener (EDF) according to an embodiment for preventing loss and misplacement of a portable device in accordance with the present invention.
Figure 3:
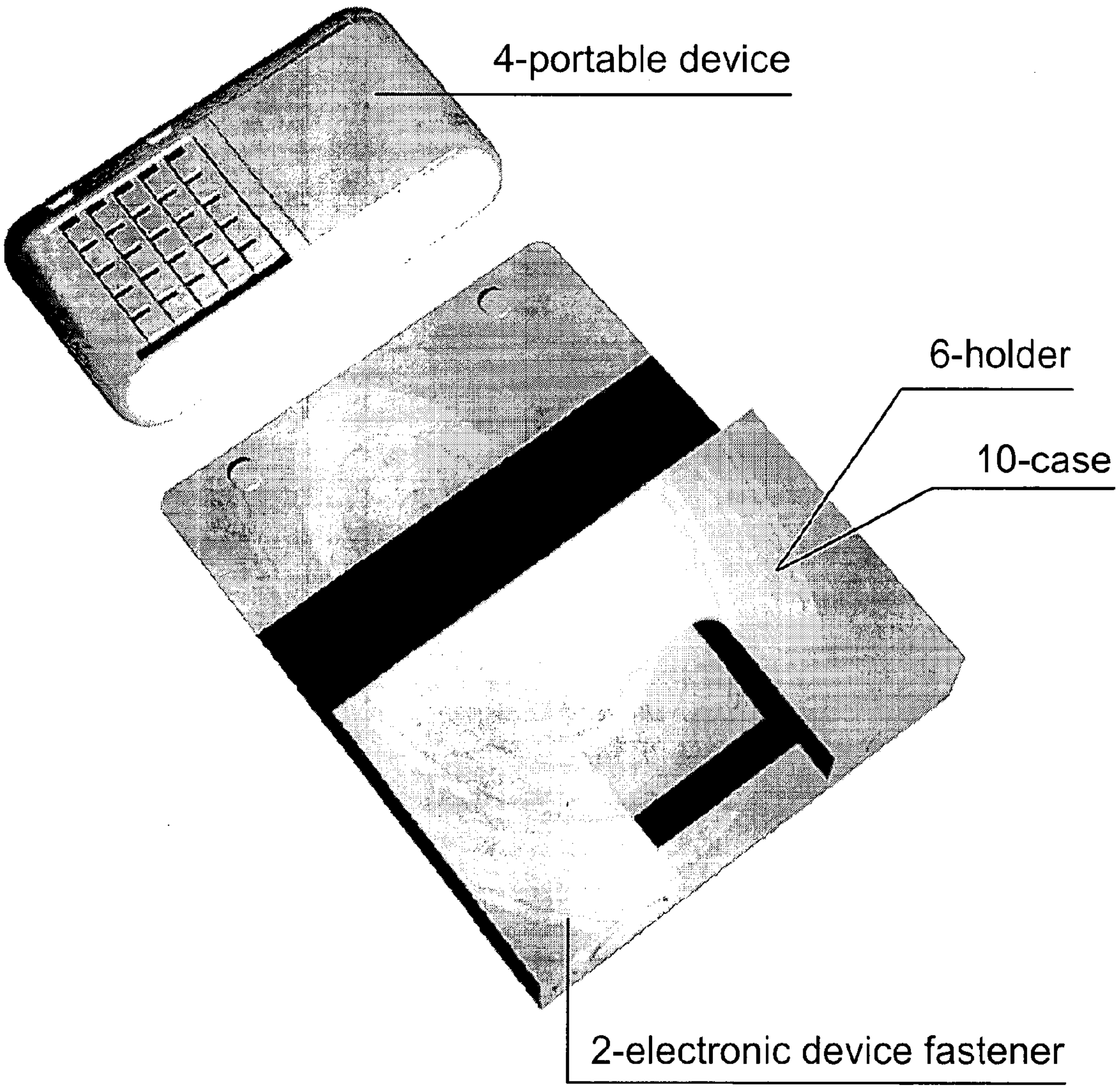
FIG. 3 is a diagrammatic view illustrating electronic device fastener (EDF) according to an embodiment that would be built into a case.
Figure 4:
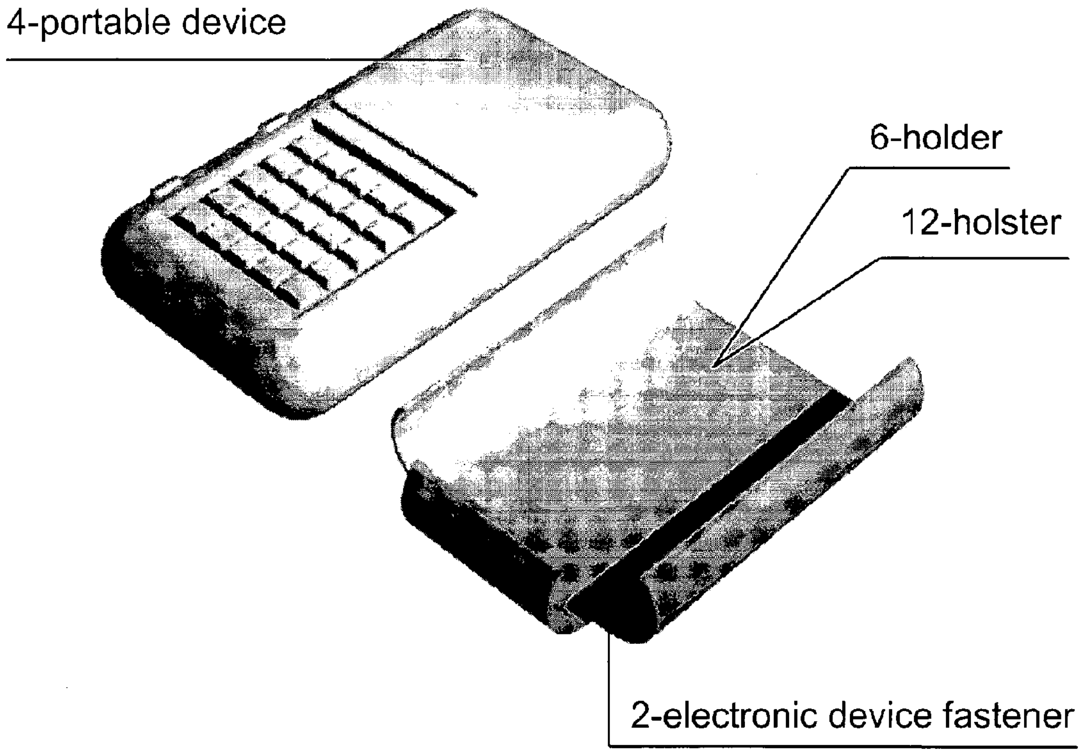
FIG. 4 is a diagrammatic view illustrating electronic device fastener (EDF) according to an embodiment that would be built into a holster.
Figure 5:
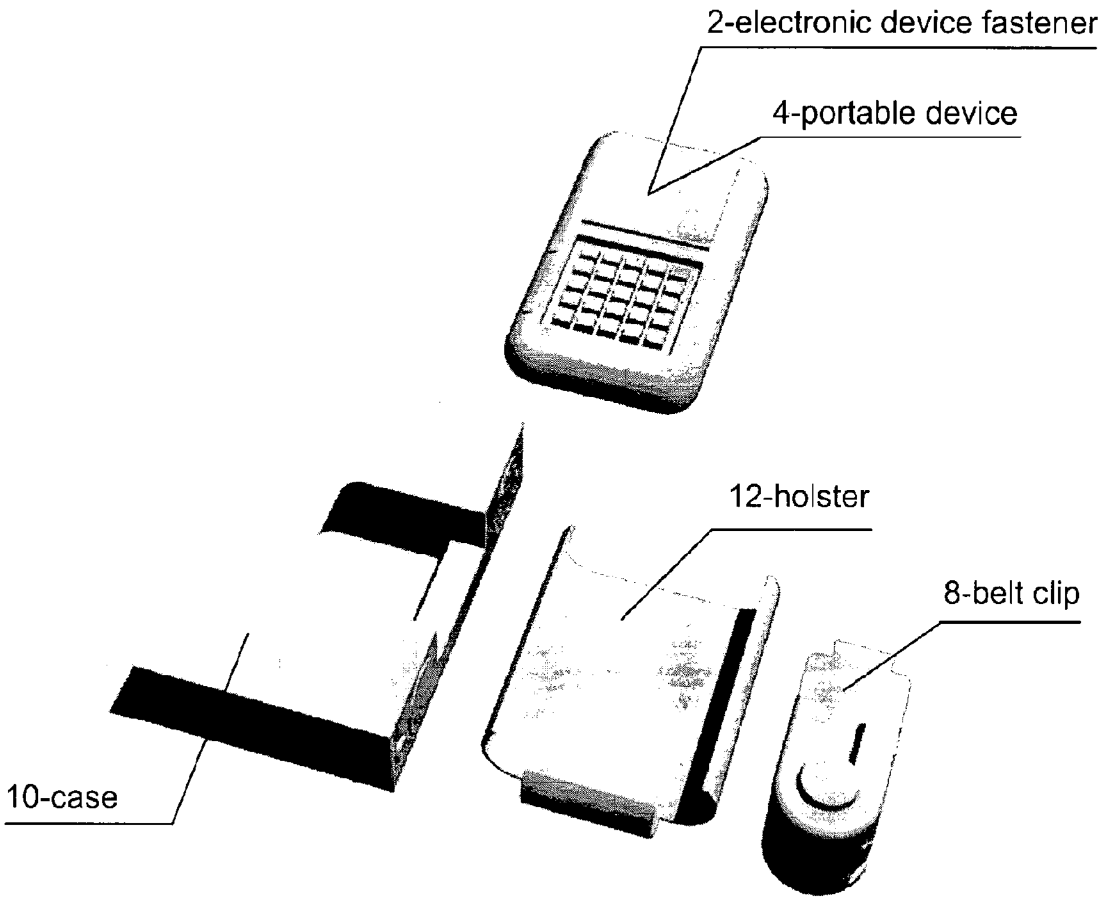
FIG. 5 is a diagrammatic view of the electronic device fastener (EDF) according to an embodiment that would be built into the periphery of a portable device.

With reference to FIGS. 1 5, the present invention has an electronic device fastener (EDF) 2 to reduce the risk of loss and misplacement of a portable device 4 by providing a system to monitor the portable device 4 and the holder 6 as illustrated in FIGS. 1, 2, 3, 4, and 5.

The electronic device fastener (EDF) 2 is a system to reduce the risk of loss and misplacement of a portable device 4 that is built into the periphery of a portable device 4 or a holder 6. The portable device 4 may be a cell phone, portable media player, personal digital assistants (PDA), two-way radio, GPS device, headset, earpiece, and other devices that the user could carry. The holder 6 is a receptacle for a portable device 4 designed to be worn or carried by the user and may be a belt clip 8, case 10, holster 12, or the like worn or carried by the user. In accordance with preferred embodiments of the present invention. the EDF 2 may be build in the built into the periphery of a portable device 4, or the holder 6, or a portion of the EDF 2 build into the portable device 4 and the remaining portion built into the holder 6. The mechanisms and modules as described herein can be connected in multitude of ways, including, but not limited to as shown in FIGS. 1, 2, 3, 4, and 5.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the claims.

FIG. 1 is a circuit block diagram of a electronic device fastener (EDF) 2 according to a preferred embodiment for preventing loss and misplacement of a portable device in accordance with the present invention. In a preferred embodiment, the system provides a portable device 4 missing from holder 6 alarm comprising of the following elements: (a) release sensor 14, and (b) proximity sensor 16, and (c) timing mechanism 18 to determine how long the portable device 4 has been removed from the holder 6, and (d) a means to provide a portable device 4 missing from holder 6 warning signal using the alert generator 20 and signaling device 22 and timing mechanism 18 measuring a predetermined period of time as defined by operation flow 24, and (e) a means to deactivate the portable device 4 missing from holder 6 warning signal by placing the portable device 4 back into the holder 6 which activates the proximity sensor 16 or by pressing the release sensor 14, and (f) a means to provide a portable device 4 missing from holder 6 alarm signal using the alert generator 20 and signaling device 22 indicating the portable device 4 is missing, and (g) a means to deactivate the portable device 4 missing from holder 6 alarm signal by placing the portable device 4 back into the holder 6 which activates the proximity sensor 16 or by pressing the release sensor 14, and (h) a means to provide a battery 28 power to the EDF 2 circuitry. In a further embodiment, the system provides a portable device 4 dislodged from holder 6 alarm comprising of the following elements: (i) a means to monitor the proximity sensor 16 by operation flow 24 and provide an alarm signal using the alert generator 20 and signaling device 22 if the portable device 4 is dislodged from the holder 6 without the release sensor 14 being pressed, and (j) a means to deactivate the portable device 4 dislodged from holder 6 alarm signal by placing the portable device 4 back into the holder 6 which activates the proximity sensor 16 or by pressing the release sensor 14. In a further embodiment, the system provides a holder 6 detached from user alarm comprising of the following elements: (k) clip sensor 30, and (l) a means to monitoring the clip sensor 30 by operation flow 24 to determine if the holder 6 spring loaded clip 40 becomes detached from the belt, pant, shirt, jacket, article of clothing, or another object, and (m) an optional means to provide a holder 6 detached from user warning signal using the alert generator 20 and signaling device 22 and timing mechanism 18 measuring a predetermined period of time as defined by operation flow 24, and (n) an optional means to deactivate the holder 6 detached from user warning signal by placing the portable device back onto the article of clothing which activates the clip sensor 30 or by pressing the release sensor 14, and (o) a means to provide a holder 6 detached from user alarm signal using the alert generator 20 and signaling device 22 indicating the clip is dislodged, and (p) a means to deactivate the holder 6 detached from user alarm signal by placing the portable device 4 back onto the article of clothing which activates the clip sensor 30 or by pressing the release sensor 14. In a further embodiment, the system provides a EDF 2 dropped alarm comprising of the following elements: (q) shock sensor 32, and (r) a means to monitoring the shock sensor 32 by operation flow 24 to determine if the EDF 2 falls from the article of clothing and hits a surface such as a floor, and (s) a means to provide a EDF 2 dropped alarm signal using the alert generator 20 and signaling device 22 indicating the EDF 2 has been dropped, and (t) a means to deactivate the EDF 2 dropped alarm signal by placing the portable device 4 back onto the article of clothing which activates the clip sensor 30 or by pressing the release sensor 14. In a further embodiment, the system provides a notification of portable device 4 removed or secured comprising of the following elements: (u) a means to monitor the release sensor 14 and proximity sensor 16 for activation, and (v) a means to provide a notification signal by operation flow 24 using the alert generator 20 and signaling device 22 that the portable device 4 is properly secured into the holder 6 and that the EDF 2 is protecting the device, and (w) a means to provide a notification signal by operation flow 24 using the alert generator 20 and signaling device 22 that the portable device 4 is properly removed from the holder 6 and that the EDF 2 is protecting the device.

Electronic device fastener (EDF) 2 means the system that could be but not limited to release sensor 14, proximity sensor 16, timing mechanism 18, alert generator 20, signaling device 22, operation flow 24, pcb 26, battery 28, clip sensor 30, and shock sensor 32. It is preferable to use multi-layer pcb 26 miniature surface mount components to keep the EDF 2 as compact dimensions as possible so that it may be easily designed into a holder 6 or portable device 4.

Release sensor 14 means one or more control devices used to control the function of the system. This could be but not limited to a touch detector, momentary switch, pressure switch, bend detector, fingerprint detector, voice recognition detector, key lock switch, visual sensor, radio-frequency identification (RFID) reader, magnetically coded card reader, or any other type of sensor capable of detecting the presence (or lack) of a human hand or any part thereof. Touch detector includes methods to detect touch by resistive, capacitance, inductance, or any other type of sensor capable of detecting the activation of a human hand or any part thereof. The release sensor 14 may be a part of the belt clip 8, case 10, holster 12, or portable device 4. Additionally, the release sensor 14 may share a part in common with the belt clip 8, case 10, holster 12, or portable device 4. One example for the belt clip 8 is the release sensor 14 may be combined with the device eject 56 where an electrical signal is provided to the system when the device eject 56 is being depressed. A second example for the case 10 is the is the release sensor 14 may be built into the main closing flap 74 with a bend detector where an electrical signal is provided to the system when the main closing flap 74 is open or closed. A third example for the portable device 4 is the release sensor 14 may be shared with the TALK button or any other button on a cell phone. When the shared button on the portable device 4 is pressed it provides an electrical signal to the system. Proximity sensor 16 means to detect the proximity (or lack) of the portable device 4. This could be but not limited to a leaf switch, push switch, pressure switch, magnetic switch, magneto resistive sensor, hall effect sensor, gravity switch, infrared switch, pressure switch, weight sensor, visual sensor, or any other type of electronic switch or sensor capable of detecting proximity (or lack) of the portable device 4. Provides an electrical indication when the device retainer 62 is in the locked position.

Timing mechanism 18 means to measures how long the portable device 4 has been removed from the holder 6 and also measures predetermined periods of time for operation flow. This could be but not limited to a microcontroller or any other form of analog or digital discrete logic to provide a timing mechanism 18.

Alert generator 20 provides means to generating warnings, alarms, or notifications to be sent to the signaling device 22.

Signaling device 22 means an audible speaker device, piezoelectric device, visual light device, or vibration device.

Operation flow 24 means the control of the EDF 2. Operation flow 24 could be but not limited to a computer program, microcontroller, discrete logic, or control logic.

PCB 26 means the printed circuit board or electronics module 70 for the EDF 2 functionality. PCB 2 6 contains the electronics necessary to decode signals from sensors and decide through its microcontroller or any other form of analog or digital discrete logic on proper course of action. PCB 26 could be but not limited to a timing mechanism 18, alert generator 20, signaling device 22, operation flow 24, battery 28, and electronics necessary to decode and operate the release sensor 14, proximity sensor 16, signaling device 22, clip sensor 30, and shock sensor 32. It is preferable to use a multi-layer printed circuit board and surface mount components to keep the pcb 26 as compact dimensions as possible.

Battery 28 means the power source for the EDF 2. This could be but not limited to a battery 28 contained in the EDF 2 which and may or may not be replaceable by the user. It is preferable to use a miniature battery to keep the EDF 2 as compact dimensions as possible. Another configuration allows for the battery 28 power to come from the portable device 4 instead of the EDF 2 having a battery 28.

Clip sensor 30 means a sensor to monitor if the holder 6 spring loaded clip 40 becomes detached from the belt, pant, shirt, jacket, article of clothing, or another object. Clip sensor 30 could be but not limited to a push switch, leaf switch, pressure switch, magnetic switch, gravity switch, electronic switch or detector.

Shock sensor 32 means a sensor to monitor if the EDF 2 falls from the article of clothing and hits a surface such as a floor. Shock sensor 32 could be but not limited to a shock sensor, accelerometer, force detector, spring or gravity switch.

Figure 2:
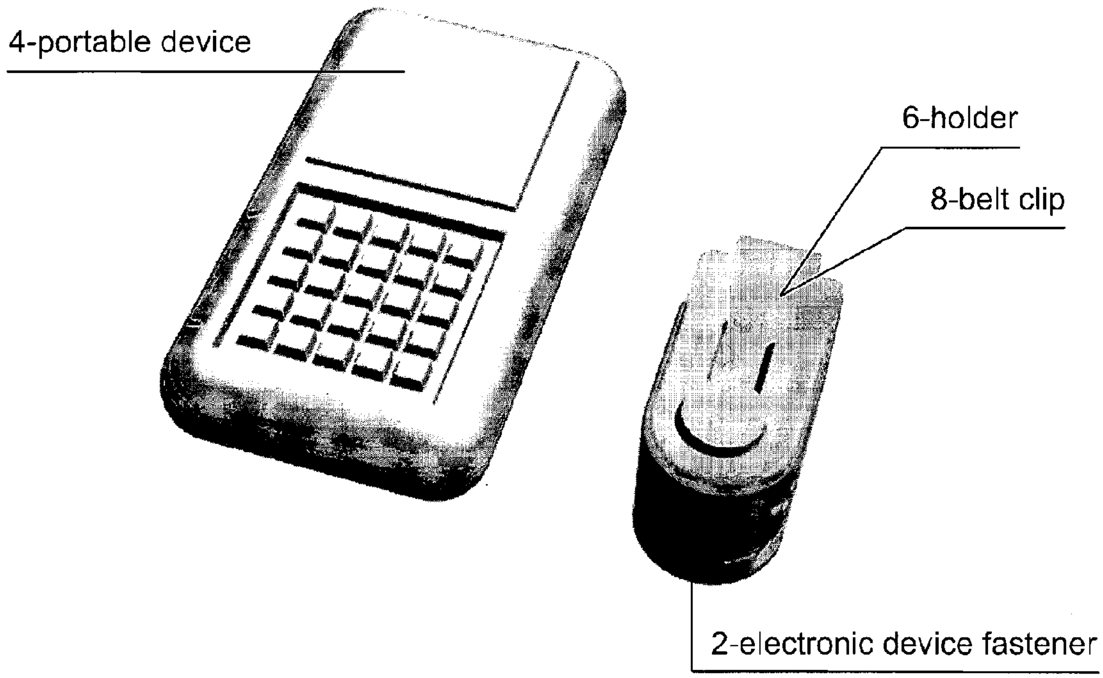
FIG. 2 is a diagrammatic view illustrating electronic device fastener (EDF) according to an embodiment that would be built into a belt clip.

FIG. 2 is a diagrammatic view illustrating electronic device fastener (EDF) 2 according to an embodiment that would be built into a belt clip 8. Holder 6 is a receptacle for a portable device 4 designed to be worn or carried by the user. Portable device 4 is usually placed in the holder 6 that is carried or attached to a person. Belt clip 8 is a form of holder 6. Belt clip 8 is a spring-action clip or a formed spring steel clip with a round post device retainer 62 that attaches to the back of the portable device 4 either by a fastener or strong adhesive. The device retainer 62 round post slips into a plastic slot on the belt clip 8. A catch 54 keeps the post locked in place until the user releases it allowing the portable device 4 to be removed from the belt clip 8 housing. The clip normally hooks over the top of a belt but may also be used to attach to trousers or other articles of clothing. The clip may also be used to attach to a purse, bag, vehicle shoulder strap, or dashboard. Electronic device fastener (EDF) 2 means the system that could be but not limited to release sensor 14, proximity sensor 16, timing mechanism 18, alert generator 20, signaling device 22, operation flow 24, pcb 26, battery 28, clip sensor 30, and shock sensor 32. It is preferable to use multi-layer pcb 26 miniature surface mount components to keep the EDF 2 as compact dimensions as possible so that it may be easily designed into a holder 6 or portable device 4. Portable device 4 could be but not limited to a cell phone, portable media player, personal digital assistants (PDA), two-way radio, GPS device, headset, earpiece, and other devices that the user could carry.

FIG. 3 is a diagrammatic view illustrating electronic device fastener (EDF) 2 according to an embodiment that would be built into a case 10. Case 10 is a form of holder 6. Case 10 is an enclosure designed to hold a portable device 4 that normally has a closing flap for protection and retention and is worn or carried by the user. The case 10 is often made of leather or nylon fabric and may have a clip to attach to a belt or clothing. Holder 6 is a receptacle for a portable device 4 designed to be worn or carried by the user. Portable device 4 is usually placed in the holder 6 that is carried or attached to a person. Electronic device fastener (EDF) 2 means the system that could be but not limited to release sensor 14, proximity sensor 16, timing mechanism 18, alert generator 20, signaling device 22, operation flow 24, pcb 26, battery 28, clip sensor 30, and shock sensor 32. It is preferable to use multi-layer pcb 26 miniature surface mount components to keep the EDF 2 as compact dimensions as possible so that it may be easily designed into a holder 6 or portable device 4. Portable device 4 could be but not limited to a cell phone, portable media player, personal digital assistants (PDA), two-way radio, GPS device, headset, earpiece, and other devices that the user could carry.

FIG. 4 is a diagrammatic view illustrating electronic device fastener (EDF) 2 according to an embodiment that would be built into a holster 12. Holster 12 is a form of holder 6. Holster 12 is an enclosure designed to hold a portable device 4 with a clip to attach to a belt or clothing and is normally worn by the user. For protection and retention, the portable device 4 may snap into the holster 12 or be secured with a closing flap. The holster 12 is often made of plastic, leather, or neoprene. Holder 6 is a receptacle for a portable device 4 designed to be worn or carried by the user. Portable device 4 is usually placed in the holder 6 that is carried or attached to a person. Electronic device fastener (EDF) 2 means the system that could be but not limited to release sensor 14, proximity sensor 16, timing mechanism 18, alert generator 20, signaling device 22, operation flow 24, pcb 26, battery 28, clip sensor 30, and shock sensor 32. It is preferable to use multi-layer pcb 26 miniature surface mount components to keep the EDF 2 as compact dimensions as possible so that it may be easily designed into a holder 6 or portable device 4. Portable device 4 could be but not limited to a cell phone, portable media player, personal digital assistants (PDA), two-way radio, GPS device, headset, earpiece, and other devices that the user could carry.

FIG. 5 is a diagrammatic view of the electronic device fastener (EDF) 2 according to an embodiment that would be built into the periphery of a portable device 4. Portable device 4 could be but not limited to a cell phone, portable media player, personal digital assistants (PDA), two-way radio, GPS device, headset, earpiece, and other devices that the user could carry. Electronic device fastener (EDF) 2 means the system that could be but not limited to release sensor 14, proximity sensor 16, timing mechanism 18, alert generator 20, signaling device 22, operation flow 24, pcb 26, battery 28, clip sensor 30, and shock sensor 32. It is preferable to use multi-layer pcb 26 miniature surface mount components to keep the EDF 2 as compact dimensions as possible so that it may be easily designed into a holder 6 or portable device 4. Portable device 4 is usually placed in the holder 6 that is carried or attached to a person that could be but not limited to a form of a belt clip 8, case 10, or holster 12.

Figure 6:
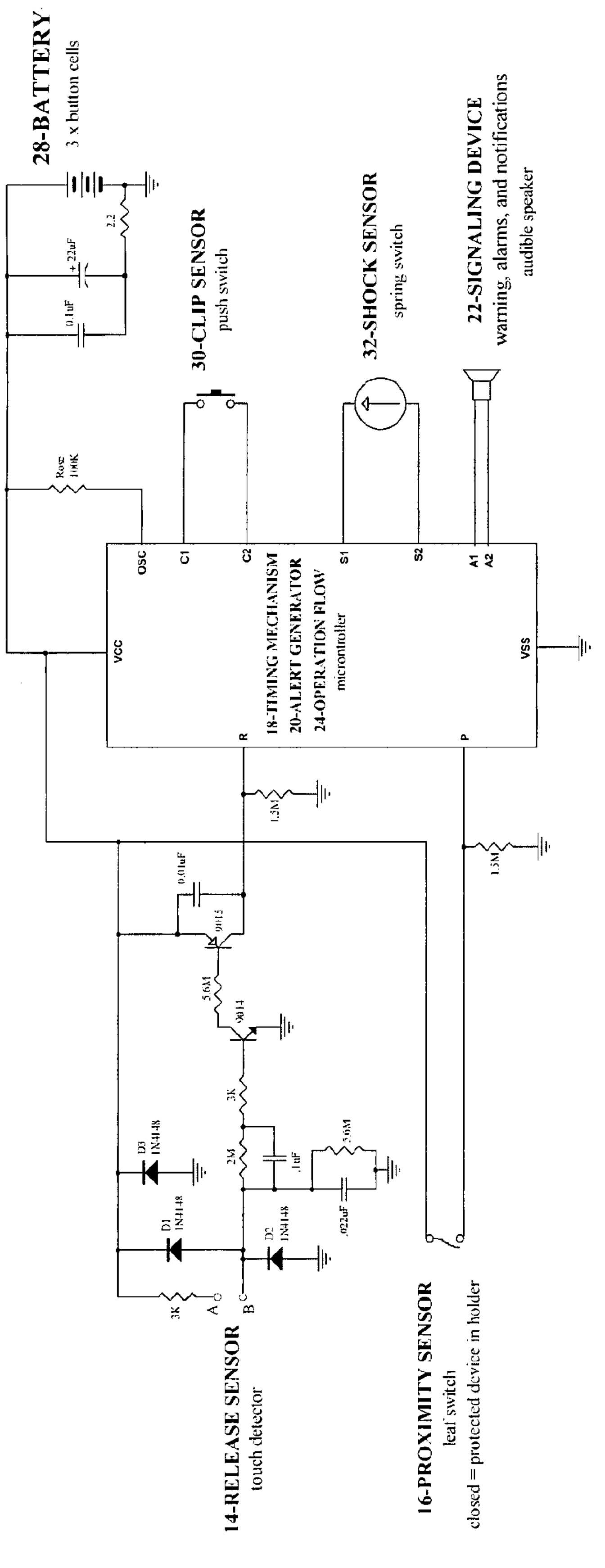
FIG. 6 is a schematic electronic circuit representation of the electronic device fastener (EDF) according to an embodiment that would be built into a holder or inside the periphery of a portable device.

FIG. 6 is a schematic electronic circuit representation of the electronic device fastener (EDF) 2 according to an embodiment that would be built into a holder 6 or inside the periphery of a portable device 4, or a portion of the system build into the portable device 4 and the remaining portion built into the holder 6. Electronic device fastener (EDF) 2 means the system that could be but not limited to release sensor 14, proximity sensor 16, timing mechanism 18, alert generator 20, signaling device 22, operation flow 24, pcb 26, battery 28, clip sensor 30, and shock sensor 32.

Figure 7:
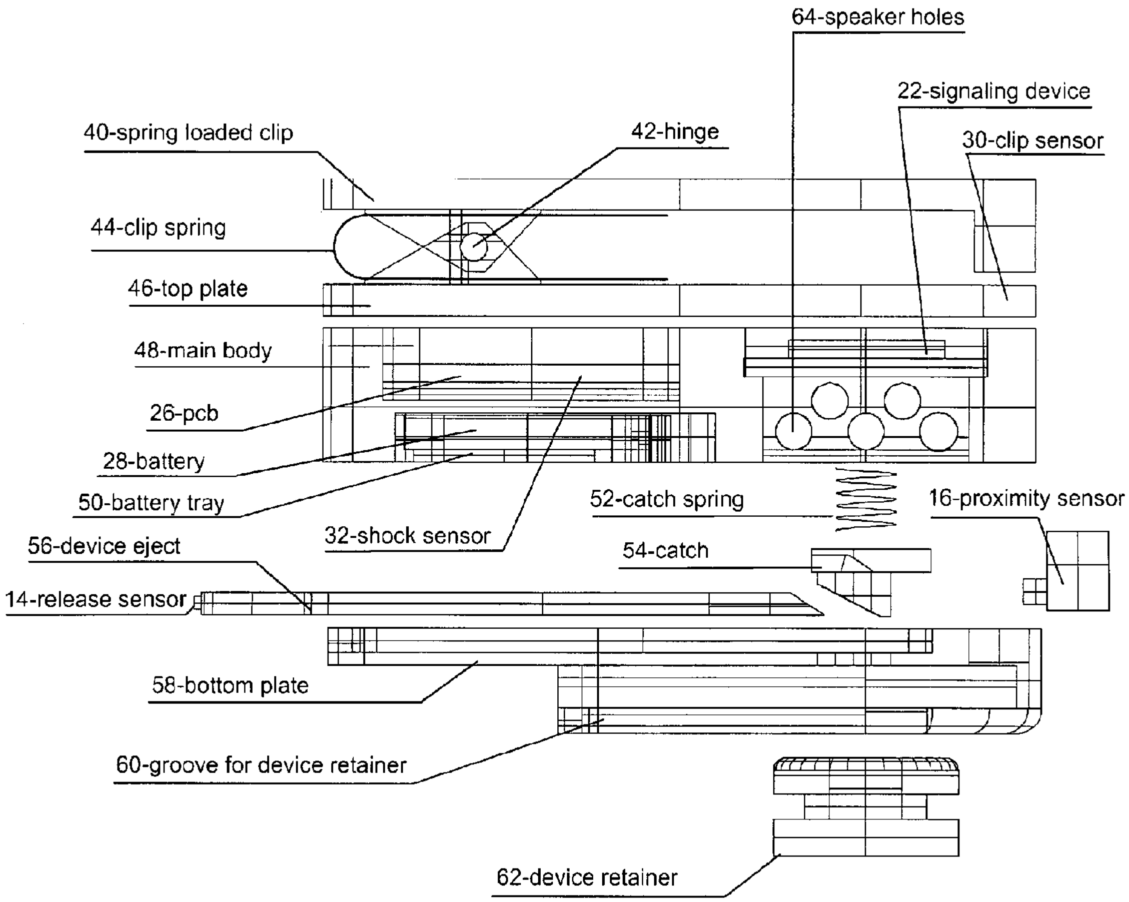
FIG. 7 is a cross sectional view of the electronic device fastener (EDF) according to an embodiment that would be built into a belt clip.

FIG. 7 is a cross sectional view of the electronic device fastener (EDF) 2 according to an embodiment that would be built into a belt clip 8. Release sensor 14 is used to control the function of the system. This could be but not limited to a touch detector, momentary switch, pressure switch, bend detector, fingerprint detector, voice recognition detector, key lock switch, visual sensor, radio-frequency identification (RFID) reader, magnetically coded card reader, or any other type of sensor capable of detecting the presence (or lack) of a human hand or any part thereof. Touch detector includes methods to detect touch by resistive, capacitance, inductance, or any other type of sensor capable of detecting the activation of a human hand or any part thereof. Additionally, the release sensor 14 may share a part in common with the belt clip 8. For example the release sensor 14 may be combined with the device eject 56 where an electrical signal is provided to the system when the device eject 56 is being depressed. Proximity sensor 16 is used to detect the proximity (or lack) of the portable device 4. This could be but not limited to a leaf switch, push switch, pressure switch, magnetic switch, magneto resistive sensor, hall effect sensor, gravity switch, infrared switch, pressure switch, weight sensor, visual sensor, or any other type of electronic switch or sensor capable of detecting proximity (or lack) of the portable device 4. Signaling device 22 could be but not limited to an audible speaker device, piezoelectric device, visual light device, or vibration device. PCB 26 is the printed circuit board and provides the EDF 2 functionality. PCB 26 contains the electronics necessary to decode signals from sensors and decide through its microcontroller or any other form of analog or digital discrete logic on proper course of action. PCB 26 could be but not limited to a timing mechanism 18, alert generator 20, operation flow 24, and electronics necessary to decode and operate the release sensor 14, proximity sensor 16, signaling device 22, clip sensor 30, and shock sensor 32. Battery 28 provides the power to the EDF 2. This could be but not limited to a battery 28 contained in the EDF 2 which and may or may not be replaceable by the user. It is preferable to use a miniature battery to keep the EDF 2 as compact dimensions as possible. Another configuration allows for the battery 28 power to come from the portable device 4 instead of the EDF 2 having a battery 28. Clip sensor 30 provides the means to monitor if the holder 6 spring loaded clip 40 becomes detached from the belt, pant, shirt, jacket, article of clothing, or another object. Shock sensor 32 provides a means to monitor if the EDF 2 falls from the article of clothing and hits a surface such as a floor. Spring loaded clip 40 is a spring-action clip or a formed spring steel clip used to fasten the EDF 2 to the user that could be but not limited to a belt, pant, shirt, jacket, article of clothing, or another object. Hinge 42 connects the spring loaded clip 40 to the top plate 46 and also secures the clip spring 44. Clip spring 44 provides tension and force to the spring loaded clip 40 to secure the EDF 2 to another object. Top plate 46 provides mounting for the clip spring 44 and hinge 42 along with being the top to the main body 48. Main body 48 is the enclosure holding the elements necessary for the EDF 2 system to function which could include but not limited to the release sensor 14, proximity sensor 16, timing mechanism 18, alert generator 20, signaling device 22, operation flow 24, pcb 26, battery 28, clip sensor 30, and shock sensor 32. Battery tray 50 holds the battery 28 which provides power to the EDF 2. Catch spring 52 provides tension to the catch 54 and keeps it in the down position until the device eject 56 is pressed. Catch 54 gets tension from the catch spring 52 and holds the device retainer 62 in the locked position within the groove for device retainer 60. Device eject 56 is a mechanism that when pressed it depresses the catch 54 which will then allow the device retainer 62 to be unlocked and slide freely in the groove for device retainer 60. Bottom plate 58 provides a channel for the device eject 56 and holds in place the catch 54 and proximity sensor 16. Groove for device retainer 60 is where the device retainer 62 slides into to be secured. The device retainer 62 is locked into position when it is slid to the bottom of the groove for device retainer 60. Device retainer 62 is a round post that attaches to the back of the portable device 4 either by a fastener or strong adhesive. The device retainer 62 is locked into position when it is slid to the bottom of the groove for device retainer 60. A catch 54 keeps the post locked in place until the user releases it allowing the portable device 4 to be removed from the belt clip 8 housing. Speaker holes 64 provides opening for the signaling device 22 which could be but not limited to a audible device such as a speaker or piezoelectric.

Figure 8:
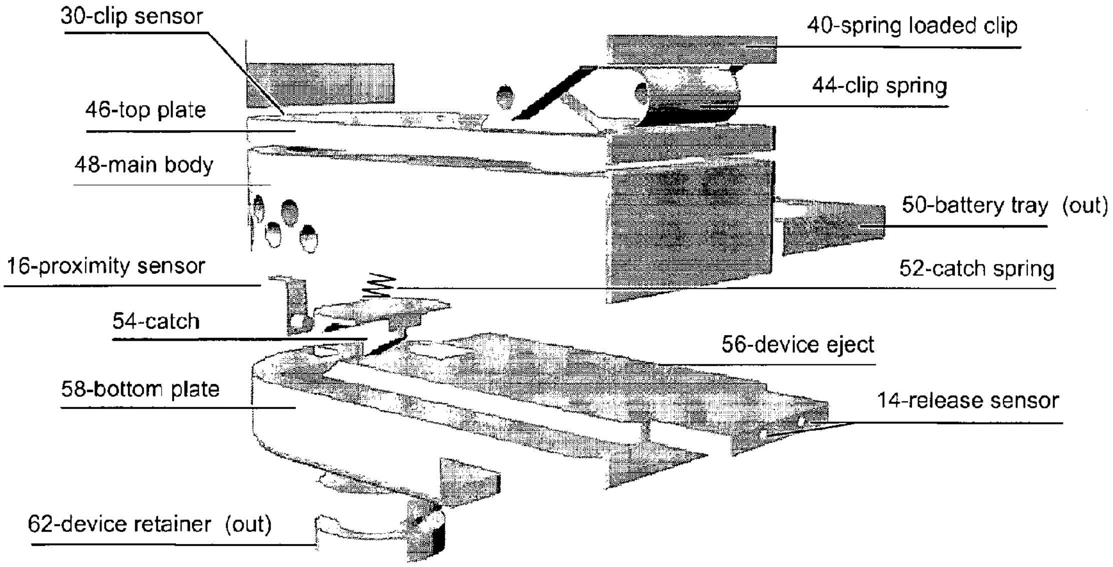
FIG. 8 is a left perspective view of the electronic device fastener (EDF) according to an embodiment that would be built into a belt clip.

FIG. 8 is a left perspective view of the electronic device fastener (EDF) 2 according to an embodiment that would be built into a belt clip 8. Release sensor 14 is used to control the function of the system. Proximity sensor 16 is used to detect the proximity (or lack) of the portable device 4. Clip sensor 30 provides the means to monitor if the holder 6 spring loaded clip 40 becomes detached from the belt, pant, shirt, jacket, article of clothing, or another object. Spring loaded clip 40 is a spring-action clip or a formed spring steel clip used to fasten the EDF 2 to the user that could be but not limited to a belt, pant, shirt, jacket, article of clothing, or another object. Clip spring 44 provides tension and force to the spring loaded clip 40 to secure the EDF 2 to another object. Top plate 46 provides mounting for the clip spring 44 and hinge 42 along with being the top to the main body 48. Main body 48 is the enclosure holding the elements necessary for the EDF 2 system to function which could include but not limited to the release sensor 14, proximity sensor 16, timing mechanism 18, alert generator 20, signaling device 22, operation flow 24, pcb 26, battery 28, clip sensor 30, and shock sensor 32. Battery tray 50 holds the battery 28 which provides power to the EDF 2. Catch spring 52 provides tension to the catch 54 and keeps it in the down position until the device eject 56 is pressed. Catch 54 gets tension from the catch spring 52 and holds the device retainer 62 in the locked position within the groove for device retainer 60. Device eject 56 is a mechanism that when pressed it depresses the catch 54 which will then allow the device retainer 62 to be unlocked and slide freely in the groove for device retainer 60. Bottom plate 58 provides a channel for the device eject 56 and holds in place the catch 54 and proximity sensor 16. Device retainer 62 is a round post that attaches to the back of the portable device 4 either by a fastener or strong adhesive.

Figure 9:
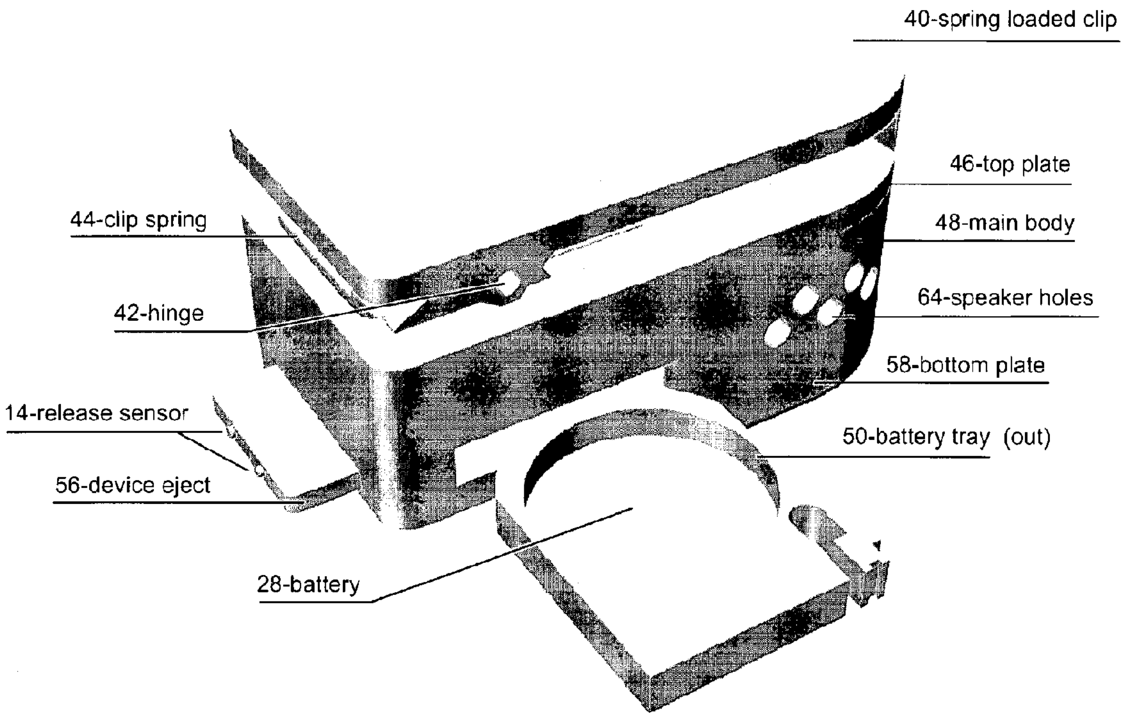
FIG. 9 is a right perspective view of the electronic device fastener (EDF) according to an embodiment that would be built into a belt clip.

FIG. 9 is a right perspective view of the electronic device fastener (EDF) 2 according to an embodiment that would be built into a belt clip 8. Release sensor 14 is used to control the function of the system. Battery 28 provides the power to the EDF 2. Spring loaded clip 40 is a spring-action clip or a formed spring steel clip used to fasten the EDF 2 to the user that could be but not limited to a belt, pant, shirt, jacket, article of clothing, or another object. Hinge 42 connects the spring loaded clip 40 to the top plate 46 and also secures the clip spring 44. Clip spring 44 provides tension and force to the spring loaded clip 40 to secure the EDF 2 to another object. Top plate 46 provides mounting for the clip spring 44 and hinge 42 along with being the top to the main body 48. Main body 48 is the enclosure holding the elements necessary for the EDF 2 system to function which could include but not limited to the release sensor 14, proximity sensor 16, timing mechanism 18, alert generator 20, signaling device 22, operation flow 24, pcb 26, battery 28, clip sensor 30, and shock sensor 32. Battery tray 50 holds the battery 28 which provides power to the EDF 2. Device eject 56 is a mechanism that when pressed it depresses the catch 54 which will then allow the device retainer 62 to be unlocked and slide freely in the groove for device retainer 60. Bottom plate 58 provides a channel for the device eject 56 and holds in place the catch 54 and proximity sensor 16. Speaker holes 64 provides opening for the signaling device 22 which could be but not limited to a audible device such as a speaker or piezoelectric.

Figure 10:
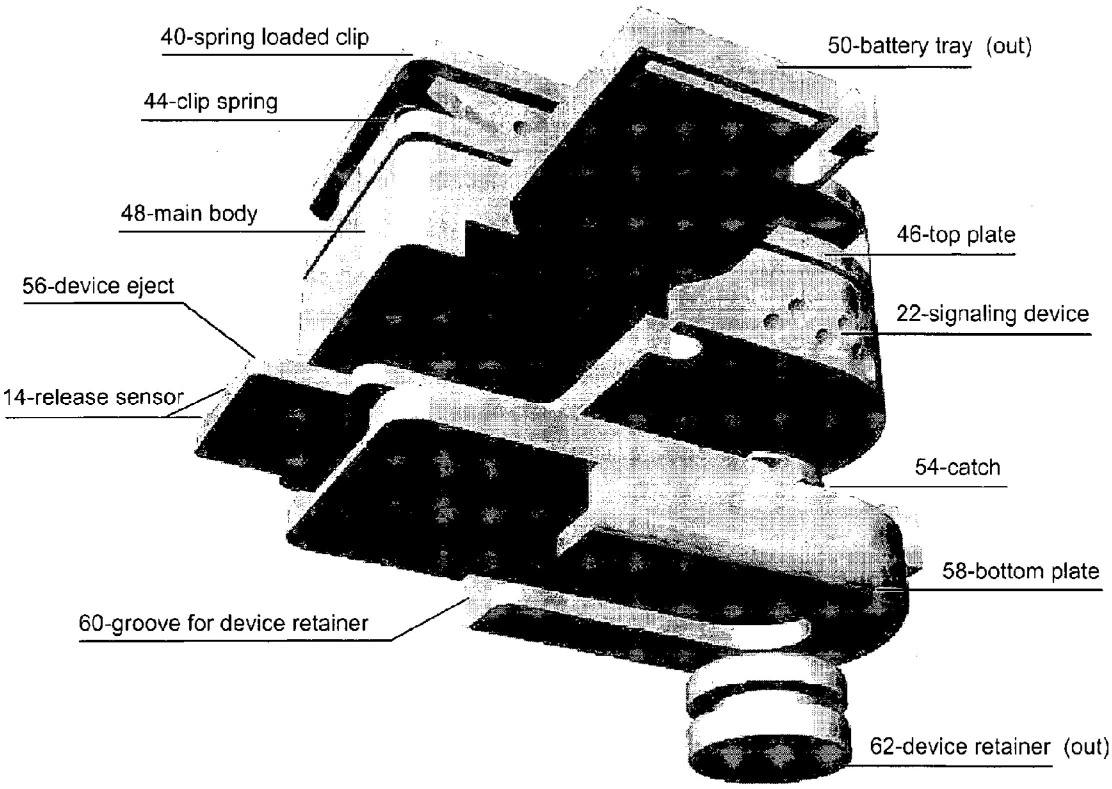
FIG. 10 is a bottom perspective view of the electronic device fastener (EDF) according to an embodiment that would be built into a belt clip.

FIG. 10 is a bottom perspective view of the electronic device fastener (EDF) 2 according to an embodiment that would be built into a belt clip 8. Release sensor 14 is used to control the function of the system. Battery 28 provides the power to the EDF 2. Spring loaded clip 40 is a spring-action clip or a formed spring steel clip used to fasten the EDF 2 to the user that could be but not limited to a belt, pant, shirt, jacket, article of clothing, or another object. Clip spring 44 provides tension and force to the spring loaded clip 40 to secure the EDF 2 to another object. Top plate 46 provides mounting for the clip spring 44 and hinge 42 along with being the top to the main body 48. Main body 48 is the enclosure holding the elements necessary for the EDF 2 system to function which could include but not limited to the release sensor 14, proximity sensor 16, timing mechanism 18, alert generator 20, signaling device 22, operation flow 24, pcb 26, battery 28, clip sensor 30, and shock sensor 32. Battery tray 50 holds the battery 28 which provides power to the EDF 2. Catch 54 gets tension from the catch spring 52 and holds the device retainer 62 in the locked position within the groove for device retainer 60. Device eject 56 is a mechanism that when pressed it depresses the catch 54 which will then allow the device retainer 62 to be unlocked and slide freely in the groove for device retainer 60. Bottom plate 58 provides a channel for the device eject 56 and holds in place the catch 54 and proximity sensor 16. Groove for device retainer 60 is where the device retainer 62 slides into to be secured. The device retainer 62 is locked into position when it is slid to the bottom of the groove for device retainer 60. Device retainer 62 is a round post that attaches to the back of the portable device 4 either by a fastener or strong adhesive.

Figure 11:
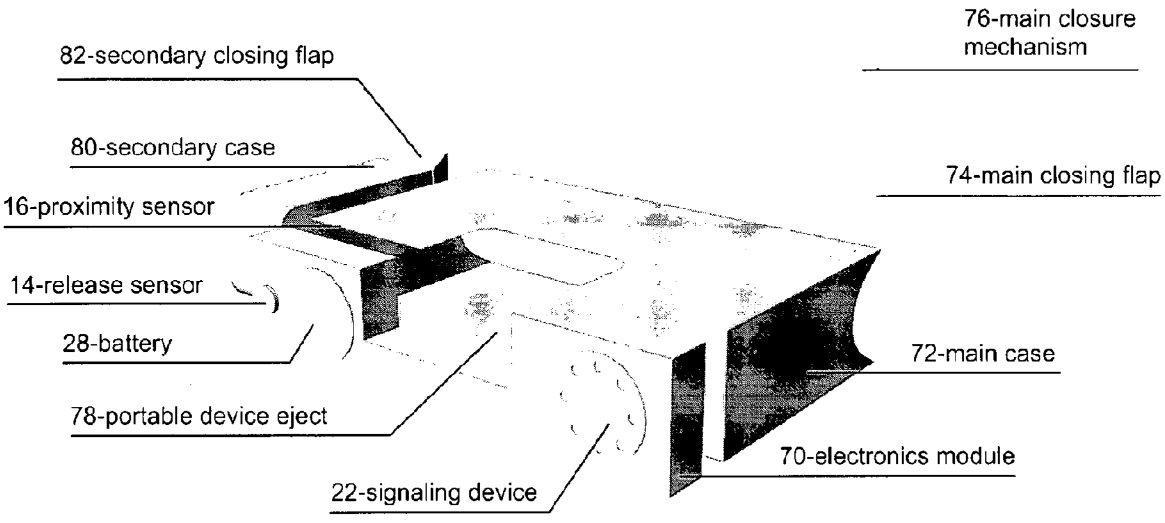
FIG. 11 is a side elevation view of the electronic device fastener (EDF) according to an embodiment that would be built into a case.

FIG. 11 is a side elevation view of the electronic device fastener (EDF) 2 according to an embodiment that would be built into a case 10. Release sensor 14 is used to control the function of the system. This could be but not limited to a touch detector, momentary switch, pressure switch, bend detector, fingerprint detector, voice recognition detector, key lock switch, visual sensor, radio-frequency identification (RFID) reader, magnetically coded card reader, or any other type of sensor capable of detecting the presence (or lack) of a human hand or any part thereof. Touch detector includes methods to detect touch by resistive, capacitance, inductance, or any other type of sensor capable of detecting the activation of a human hand or any part thereof. Additionally, the release sensor 14 may share a part in common with the case 10. For example the release sensor 14 may be built into the main closing flap 74 with a bend detector where an electrical signal is provided to the system when the main closing flap 74 is open or closed. Proximity sensor 16 is used to detect the proximity (or lack) of the portable device 4. This could be but not limited to a leaf switch, push switch, pressure switch, magnetic switch, magneto resistive sensor, hall effect sensor, gravity switch, infrared switch, pressure switch, weight sensor, visual sensor, or any other type of electronic switch or sensor capable of detecting proximity (or lack) of the portable device 4. Signaling device 22 could be but not limited to an audible speaker device, piezoelectric device, visual light device, or vibration device. Battery 28 provides the power to the EDF 2. This could be but not limited to a battery 28 contained in the EDF 2 which and may or may not be replaceable by the user. It is preferable to use a miniature battery to keep the EDF 2 as compact dimensions as possible. Another configuration allows for the battery 28 power to come from the portable device 4 instead of the EDF 2 having a battery 28. Electronics module 70 contains the electronics necessary to decode signals from sensors and decide through its microcontroller or any other form of analog or digital discrete logic on proper course of action. Electronics module 70 could be but not limited to a timing mechanism 18, alert generator 20, signaling device 22 operation flow 24, battery 28, and electronics necessary to decode and operate the release sensor 14, proximity sensor 16, signaling device 22, clip sensor 30, and shock sensor 32. Main case 72 is an enclosure that holds the portable device 4 that is carried or worn by the user including but not limited to a cell phone, portable media player, or personal digital assistants (PDA). Main closing flap 74 is a piece of material that closes on top of our around the portable device 4 to secure it into the holder 6. Main closure mechanism 76 is any of the usual closure mechanism found on portable device 4 cases, including but not limited to magnetic, slide, button, patent closure, etc. Portable device eject 78 is a cavity, slot, or opening that allows the portable device 4 to be pushed or pulled out of the case 10.

In accordance with a preferred embodiment of the present invention, a secondary case 80 can be provided to hold an accessory device to a portable device 4 that is carried or worn by the user including, but not limited to a headset, earpiece, or other accessory. The electronic device fastener (EDF) 2 can also monitor this secondary case 80 by having a plurality of sensors. For example, a second proximity sensor or release sensor can be included in the system to protect the secondary case 80 accessory device from loss and misplacement and said plurality of sensors can provide the same level of protection in the secondary case 80 as in the main case 72. Secondary closing flap 82 is a piece of material that closes on top of our around the accessory device to secure it into the secondary case 80. Additionally, if a second release sensor is included in the system, it may share a part in common with the secondary case 80. For example the second release sensor may be built into the secondary closing flap 82 with a bend detector where an electrical signal is provided to the system when the secondary closing flap 82 is open or closed.

Figures 12, 13:
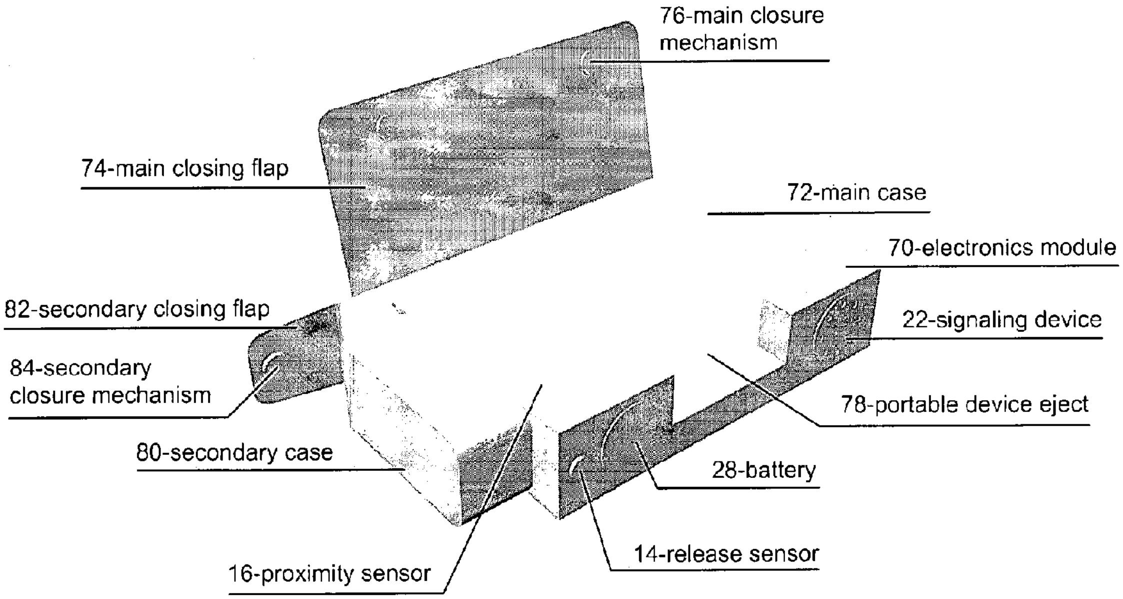
FIG. 12 is a top elevation view of the electronic device fastener (EDF) according to an embodiment that would be built into a case.
FIG. 13 is a diagrammatic view of the electronic device fastener (EDF) according to an embodiment that would be built into the periphery of a portable device.
Figure 13:
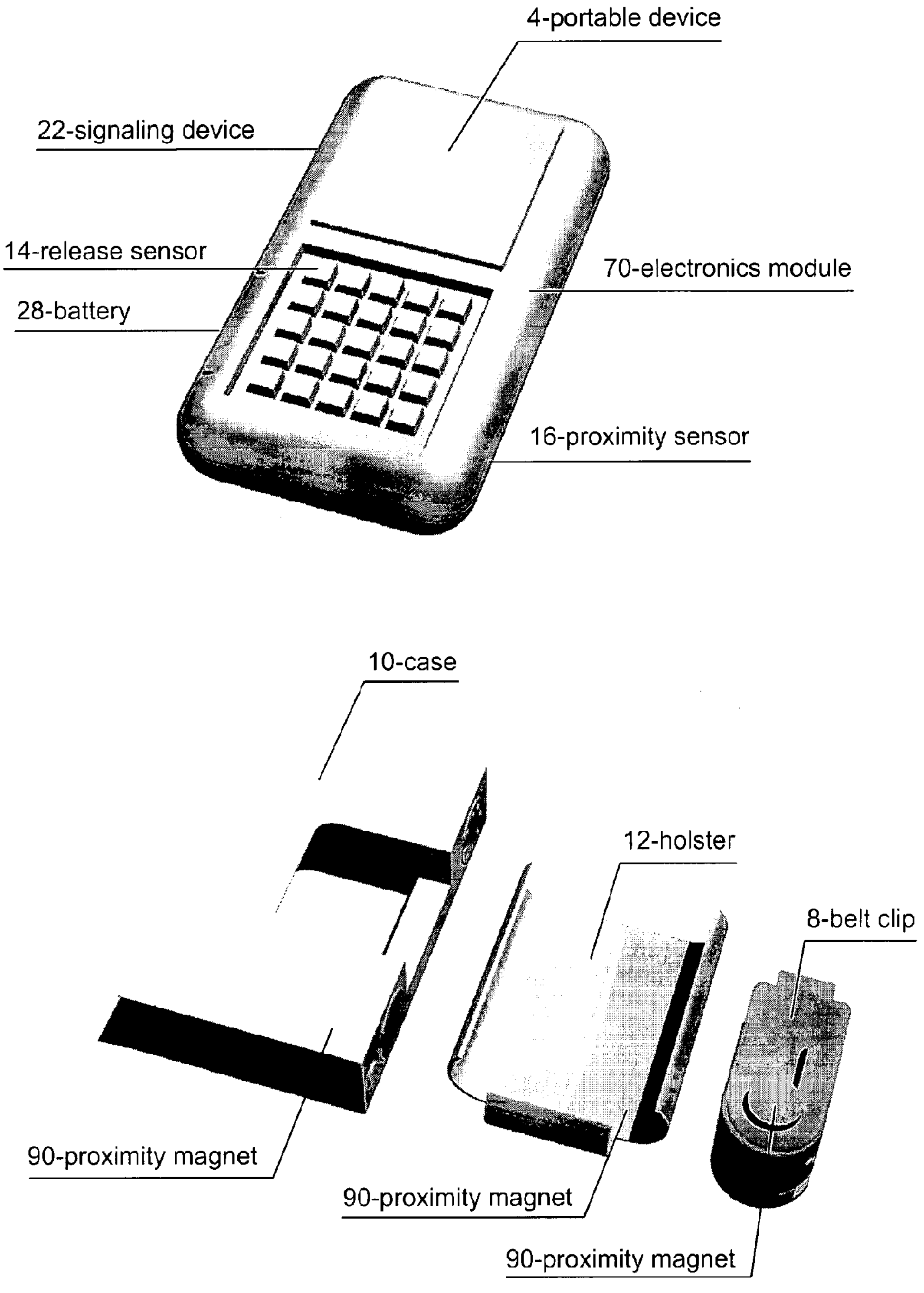

FIG. 12 is a top elevation view of the electronic device fastener (EDF) 2 according to an embodiment that would be built into a case 10. Release sensor 14 is used to control the function of the system. Proximity sensor 16 is used to detect the proximity (or lack) of the portable device 4. Signaling device 22 could be but not limited to an audible speaker device, piezoelectric device, visual light device, or vibration device. Battery 28 provides the power to the EDF 2. Electronics module 70 contains the electronics necessary to decode signals from sensors and decide through its microcontroller or any other form of analog or digital discrete logic on proper course of action. Main closing flap 74 is a piece of material that closes on top of our around the portable device 4 to secure it into the holder 6. Main closure mechanism 76 is any of the usual closure mechanism found on portable device 4 cases, including but not limited to magnetic, slide, button, patent closure, etc. Portable device eject 78 is a cavity, slot, or opening that allows the portable device 4 to be pushed or pulled out of the case 10. Secondary case 80 is an enclosure that holds the accessory device to a portable device 4 that is carried or worn by the user including, but not limited to a headset, earpiece, or other accessory. Secondary closing flap 82 is a piece of material that closes on top of our around the accessory device to secure it into the holder 6. Secondary closure mechanism 84 is any of the usual closure mechanism found on portable cases, including but not limited to magnetic, slide, button, patent closure, etc. In accordance with a preferred embodiment of the present invention, the electronic device fastener (EDF) 2 can also monitor this secondary case 80 by having a plurality of sensors as discussed in FIG. 11.

FIG. 13 is a diagrammatic view of the electronic device fastener (EDF) 2 according to an embodiment that would be built into the periphery of a portable device 4. Release sensor 14 is used to control the function of the system. This could be but not limited to a touch detector, momentary switch, pressure switch, bend detector, fingerprint detector, voice recognition detector, key lock switch, visual sensor, radio-frequency identification (RFID) reader, magnetically coded card reader, or any other type of sensor capable of detecting the presence (or lack) of a human hand or any part thereof. Touch detector includes methods to detect touch by resistive, capacitance, inductance, or any other type of sensor capable of detecting the activation of a human hand or any part thereof. Additionally, the release sensor 14 may share a part in common with the portable device 4. For example the release sensor 14 may be shared with the TALK button or any other button on a cell phone. When the shared button on the portable device 4 is pressed it provides an electrical signal to the system. Proximity sensor 16 is used to detect the proximity (or lack) of the portable device 4. This could be but not limited to a leaf switch, push switch, pressure switch, magnetic switch, magneto resistive sensor, hall effect sensor, gravity switch, infrared switch, pressure switch, weight sensor, visual sensor, or any other type of electronic switch or sensor capable of detecting proximity (or lack) of the portable device 4. Signaling device 22 could be but not limited to an audible speaker device, piezoelectric device, visual light device, or vibration device. Battery 28 provides the power to the EDF 2. This could be but not limited to a battery 28 contained in the EDF 2 which and may or may not be replaceable by the user. It is desirable to have the battery 28 power to come from the portable device 4 instead of the EDF 2 having a separate battery 28. Electronics module 70 contains the electronics necessary to decode signals from sensors and decide through its microcontroller or any other form of analog or digital discrete logic on proper course of action. Electronics module 70 could be but not limited to a timing mechanism 18, alert generator 20, signaling device 22 operation flow 24, battery 28, and electronics necessary to decode and operate the release sensor 14, proximity sensor 16, signaling device 22, clip sensor 30, and shock sensor 32. Holder 6 is a receptacle for a portable device 4 designed to be worn or carried by the user. Portable device 4 is usually placed in the holder 6 that is carried or attached to a person. It could be but is not limited to a form of a belt clip 8, case 10, or holster 12. Proximity magnet 90 can be mounted in the belt clip 8, case 10, or holster 12 to activate the proximity sensor 16 that uses a magnet for activation.

In another preferred embodiment not shown all or part of the EDF 2 may be designed into a skin. A skin covering is designed to be to attached to the portable device 4 housing and is often used to for protecting and customizing a portable device 4.

Figure 14:
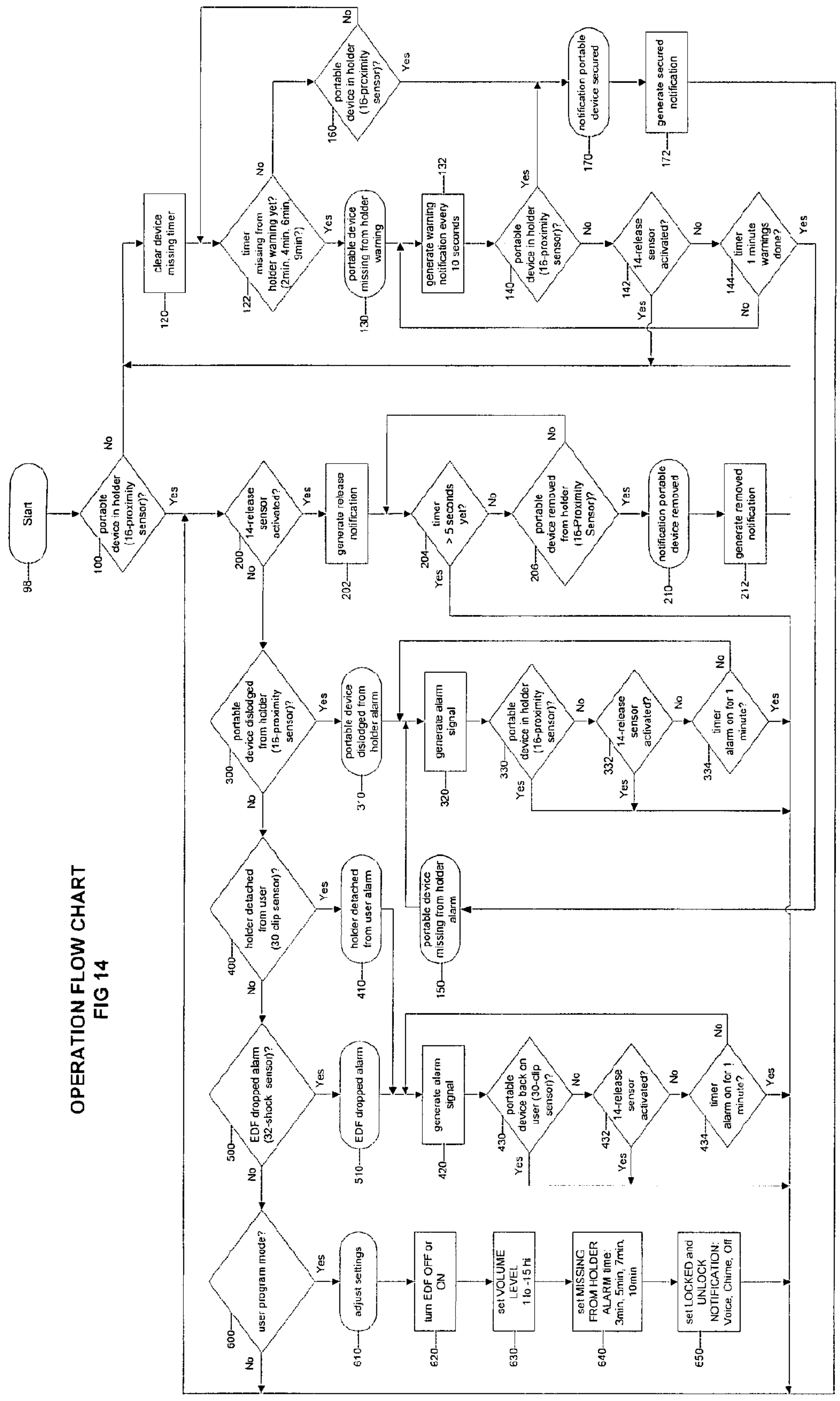
FIG. 14 shows an operation flow chart diagram of the present invention.

FIG. 14 shows an operation flow chart illustration of the present invention. The operation flow could be but not limited to a computer program inside the memory of a microprocessor control unit otherwise known as a microchip. The program begins at the entry point 98 for the start of the system when the battery power is first applied or at reset. Proximity sensor at 100 is monitored to determine if the portable device is in the holder. The program proceeds to 120 if the portable device is missing, otherwise to 200 if the portable device is present. Point 200 is also the normal starting point for system loss and misplacement monitoring when the portable device is in the holder. Reference will now be made in detail to the preferred embodiments of the method.

In a preferred embodiment of the method, the portable device missing from holder warning and alarm function begins at point 200. At block 200 the release sensor 14 activation is monitored. If release sensor 14 is activated then 200-Yes will proceed to 202, otherwise if release sensor 14 is not active then 200-No will proceed to 300. First a means is given to provide a notification that the portable device is released and properly removed from the holder and that the EDF is protecting the device. At 202 a release notification may be given by the signaling device. A release timer is started at 204 which by example given is five seconds. The program loops at 204-No and 206-No for five seconds waiting for the portable device to be removed from the holder by monitoring the proximity sensor 16 in block 206. The system goes back to starting point for system loss and misplacement monitoring at 204-Yes if the portable device is not removed from the holder within the five seconds. Otherwise, portable device is removed within the five seconds at 206-Yes. At 210, 212 a removed notification may be given by the alert generator and signaling device to indicate that the portable device is released and properly removed from the holder and that the EDF is protecting the device. Next a timing mechanism determines how long the portable device has been removed from the holder and a means to provide a portable device missing from holder warning signal. A portable device missing warning timer is started at 120 which by example given may count up to 2, 4, 6, or 9 minutes. The program loops at 122-No and 160-No waiting for the portable device to be returned back to the holder by monitoring the proximity sensor 16 in block 160. Next a means is given in block 170, 172 to provide a notification that the portable device is properly secured into the holder and that the EDF is protecting the device. If the portable device is returned to the holder before the warning time, flow proceeds to 160-Yes and at 170, 172 a portable device secured notification may be given by the alert generator and signaling device, then the system goes back to starting point for system loss and misplacement monitoring. Otherwise system keeps looping at 122-No and 160-No waiting for the warning timer to be reached while the portable device is not in the holder. Program proceeds to 122-Yes when the warning timer is reached and a missing from holder warning notification is given at 130. In this example, a missing from holder warning notification is given every ten seconds for one minute before the alarm is activated by program 132 and 144-No. Next a means is given to deactivate the portable device missing from holder warning signal by placing the portable device back into the holder which activates the proximity sensor 16 in block 140, or by activating the release sensor 14 in block 142, or by timing mechanism in block 144 to stop the warning after a predetermined period of time. Proximity sensor 16 at block 140 is monitored to determine if the portable device is placed back in the holder, and if so the warning notification is deactivated at 140-Yes and then block 170, 172 provides a notification that the portable device is properly secured into the holder and that the EDF is protecting the device. If the portable device is not returned to the holder then program proceeds to 140-No. Release sensor 14 at block 142 is monitored for activation and upon activation warning notification is deactivated at 142-Yes by restarting the portable device missing warning timer at 120. Otherwise a portable device missing from holder alarm notification will occur when the timer one minute warnings are done at 144-Yes. Next 150 provides a means for a portable device missing from holder alarm signal. Block 320 generates the alarm signal using the alert generator and signaling device. Block 330, 332, 334 provides a means to deactivate the portable device missing from, holder alarm signal by placing the portable device back into the holder which activates the proximity sensor 16 in block 330, or by activating the release sensor 14 in block 332, or by timing mechanism in block 334 to stop the alarm after a predetermined period of time. Proximity sensor 16 at block 330 is monitored to determine if the portable device is placed back in the holder and if so portable device missing from holder alarm is deactivated at 330-Yes. Likewise, release sensor 14 at block 332 is monitored for activation and upon activation missing from holder alarm is deactivated at 332-Yes. Otherwise the portable device missing from holder alarm continues at 334-No until a predetermined period of time is reached for alarm timeout with the example given of 1 minute for 334-Yes, then the system goes back to starting point for system loss and misplacement monitoring.

In another preferred embodiment of the method, the portable device dislodged from holder alarm function begins at point 300. At block 300 the proximity sensor 16 is monitored to determine if the portable device is removed from the holder without the user activating the release sensor 14. If proximity sensor 16 is activated then 300-Yes will proceed to 310, otherwise if proximity sensor 16 is not active then 300-No will proceed to 400. Next 310 provides a means for a portable device dislodged from holder alarm signal. Block 320 generates the alarm signal using the alert generator and signaling device. Block 330, 332, 334 provides a means to deactivate the portable device dislodged from holder alarm signal by placing the portable device back into the holder which activates the proximity sensor 16 in block 330, or by activating the release sensor 14 in block 332, or by timing mechanism in block 334 to stop the alarm after a predetermined period of time. Proximity sensor 16 at 330 is monitored to determine if the portable device is in the holder and portable device dislodged from holder alarm is deactivated at 330-Yes if the portable device is placed back in the holder. Likewise, release sensor 14 at block 332 is monitored for activation and upon activation dislodged from holder alarm is deactivated at 332-Yes. Otherwise the portable device dislodged from holder alarm continues at 334-No until a predetermined period of time is reached for alarm timeout with the example given of 1 minute for 334-Yes, then the system goes back to starting point for system loss and misplacement monitoring.

In another preferred embodiment of the method, the holder detached from user alarm function begins at point 400. At block 400 the clip sensor 30 is monitored to determine if the clip becomes detached from the belt, pant, shirt, jacket, article of clothing, or another object. If clip sensor 30 is activated then 400-Yes will proceed to 410, otherwise if clip sensor 30 is not active then 400-No will proceed to 500. Next 410 provides a means for a holder detached from user alarm signal. Block 420 generates the alarm signal using the alert generator and signaling device. Block 430, 432, 434 provides a means to deactivate the holder detached from user alarm signal by attaching the EDF back onto the article of clothing which activates the clip sensor 30 in block 430, or by or by activating the release sensor 14 in block 432, or by timing mechanism in block 434 to stop the alarm after a predetermined period of time. Clip sensor 30 at block 430 is monitored to determine if the EDF is attached back onto the article of clothing and if so holder detached from user alarm is deactivated at 430-Yes. Likewise, release sensor 14 at block 432 is monitored for activation and upon activation holder detached from user alarm is deactivated at 432-Yes. Otherwise the holder detached from user alarm continues at 434-No until a predetermined period of time is reached for alarm timeout with the example given of 1 minute for 434-Yes, then the system goes back to starting point for system loss and misplacement monitoring. Alternatively not shown, the proximity sensor 16 could be used, instead of or in addition to the clip sensor 30 in block 430 to deactivate the EDF dropped alarm signal. Also not shown, the operation flow could also have a warning signal prior to the actual alarm signal. The warning signal is provided for a predetermined period of time (example 15 seconds) and if it is not cancelled then the holder detached from user alarm will occur. The user could cancel the detachment warning by placing the EDF back onto the article of clothing which activates the clip sensor 30, or by activating the release sensor 14 on the EDF.

In another preferred embodiment of the method, the portable device EDF dropped alarm function begins at point 500. At block 500 the shock sensor 32 is monitored to determine if the EDF 2 falls from the article of clothing and hits a surface such as a floor. If shock sensor 32 is activated then 500-Yes will proceed to 510, otherwise if shock sensor 32 is not active then 500-No will proceed to 600. Next 510 provides a means for a EDF dropped alarm signal. Block 420 generates the alarm signal using the alert generator and signaling device. Block 430, 432, 434 provides a means to deactivate the EDF dropped alarm signal by attaching the EDF back onto the article of clothing which activates the clip sensor 30 in block 430, or by or by activating the release sensor 14 in block 432, or by timing mechanism in block 434 to stop the alarm after a predetermined period of time. Clip sensor 30 at block 430 is monitored to determine if the EDF is attached back onto the article of clothing and if so EDF dropped alarm is deactivated at 430-Yes. Likewise, release sensor 14 at block 432 is monitored for activation and upon activation EDF dropped alarm is deactivated at 432-Yes. Otherwise the EDF dropped alarm continues at 434-No until a predetermined period of time is reached for alarm timeout with the example given of 1 minute for 434-Yes, then the system goes back to starting point for system loss and misplacement monitoring. Alternatively not shown, the proximity sensor 16 could be used, instead of or in addition to the clip sensor 30 in block 430 to deactivate the EDF dropped alarm signal.

In another preferred embodiment of the method, a means is given to enter a user program mode. At block 600 program mode is monitored to determine if the user wants to change EDF settings. If program mode is activated then 600-Yes will proceed to 610, otherwise if program mode is not activated then 500-No will proceed to starting point for system loss and misplacement monitoring. Block 610 starts the adjustment settings. It is desirable that the alert generator and signaling device provide speech audio or a digital readout of the EDF settings to make it easier for the user to change and confirm the settings. For example in block 610 the EDF could say in human voice "You have entered the user settings mode". Block 620 allows the EDF functionality to be turned OFF or ON. Normally the EDF is ON protecting the portable device from loss and misplacement. However for example it may be desirable for the user to disable the EDF if the portable device is going to be out of the holder for a long period of time. Block 630 allows the user to change the volume levels of the alert generator and signaling device. For example, it may be desirable for the user to change the volume level of the warnings and notifications. Block 640 allows the user to change the missing from holder alarm time. For example, it may be desirable for the user to change the missing from holder alarm time longer or shorter depending on how long they typically remove the portable device from the holder. Block 650 allows the user to set the locked and unlock notifications. The user may find it more desirable to change the notifications to voice. For example, the EDF could say "Locked" whenever the portable device is properly secured in the holder. Likewise, the user may want just a chime sound when the portable device is placed in the holder. Another possibility is the user may want to turn off these notifications.

The invention has been shown and described in what is presently conceived to be the most practical and preferred embodiment of the invention. Once given the above disclosure, therefore, various other modifications, features, and/or improvements will become apparent to the skilled artisan. Such other features, modifications, and improvements are thus considered a part of this invention, the scope of which is to be determined by the following claims.

The invention claimed is:

1. Apparatus for protecting a portable device against loss or displacement from a personal carrier, comprising:

a portable device such as a cell phone or the like;

a carrier for said device which is capable of being worn or carried by a person using the device, the carrier including one or more sensors operative in a plurality of modes for providing a signal to the user when a sensor has been activated, at least one of said sensors being an impact sensor in combination with an alarm device for providing an alarm signal when said device is dropped on a hard surface; and means for resetting said sensors to a quiescent state after activation.

2. The apparatus of claim 1, wherein a first one of said sensors is a removal sensor for detecting the absence of said device from the carrier.

3. The apparatus of claim 2, wherein said removal sensor includes a timer for tracking the time duration of absence of the device from said carrier.

4. The apparatus of claim 1, further including a release element for controlling release of the device from the carrier.

5. The apparatus of claim 4, wherein said release element further includes a sensor for detecting activation of the release element and inhibiting the activation of said time.

6. The apparatus of claim 5, further including an alarm member coupled to the timer for providing an alarm signal at the end of a predetermined timing interval.

7. The apparatus of claim 1, further including a mounting clip coupled to the carrier for attaching the carrier to clothing worn by the user, and a sensor for detecting dislodgement of the mounting clip from the attachment position.

8. The apparatus of claim 4, further including an indicator member for providing a first signal when the device is present in the carrier and a second signal when the device is removed from the carrier by activation of the release member.

9. Apparatus for use with the combination of a cell phone and a holder for providing signals to a user in the event of separation of the cell phone from the holder, comprising:

a holder for the cell phone, the holder having a mounting clip for attachment to an article of clothing worn by a user;

a cell-phone-present sensor for providing a signal when the cell phone is in the holder;

a timer coupled to said sensor;

means for activating the timer in the absence of a signal from the cell-phone-present sensor;

an alarm signaling device for generating an alarm signal after a predetermined interval of timer activation to indicate the absence of the cell phone from the holder;

a release member for releasing the cell phone from the holder; and a sensor coupled to the release member for inhibiting the activation of the timer upon release of the cell phone from the holder.

10. The apparatus of claim 9, further including a mounting clip for affixing the holder to an article of clothing; and a sensor coupled to the mounting clip for providing an alarm when the holder is absent from said article of clothing.

11. The apparatus of claim 10, further including an impact sensor for generating an impact signal upon the holder impacting a hard surface with a shock in excess of a predetermined level.

12. The apparatus of claim 11, further including means for cancelling the impact signal.

* * * * *